Figure 1:
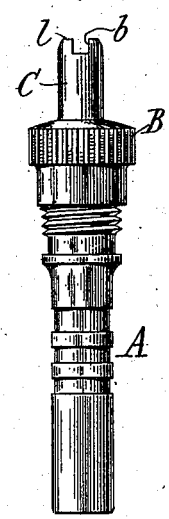

No. 724,128. PATENTED MAR. 31, 1903.
G. H. F. SCHRADER.
TIRE VALVE AND CAP.
APPLICATION FILED JUNE 21, 1898. RENEWED JULY 18, 1902.
NO MODEL.

WITNESSES:
Fred White
Thomas F. Wallace

INVENTOR:
George H. F. Schrader,
By his Attorneys.

UNITED STATES PATENT OFFICE.

GEORGE H. F. SCHRADER, OF NEW YORK, N. Y.

TIRE-VALVE AND CAP.

SPECIFICATION forming part of Letters Patent No. 724,128, dated March 31, 1903.

Application filed June 21, 1898. Renewed July 18, 1902. Serial No. 116,106. (No model.)

*To all whom it may concern:*

Be it known that I, GEORGE H. F. SCHRADER, a citizen of the United States, residing in the city, county, and State of New York, have invented certain new and useful Improvements in Tire-Valves and Caps, of which the following is a specification.

This invention relates to tire and other valves and to caps therefor.

Heretofore tire-valves have been constructed with a tubular plug screwed within a socket in the shell for holding the valve-seat in place, through which plug the valve-stem or deflating-pin has projected, so that by inserting a tool into the socket the end of the stem could be reached for deflating the valve, or by inserting a screw-driver and pressing in the stem until the screw-notch of the plug was engaged the plug could be unscrewed for permitting access to the valve proper. The pressure and spring tension against the valve-stem have acted to disengage the screw-driver unless great care was taken and a continual pressure exerted to hold it in engagement, making the act of inserting or removing the plug a difficult and delicate one. The screw-driver has endangered bending or impairment of the stem by reason of the liability of the latter to get at one side of the screw-driver tip and be twisted owing to its slender proportions, a slight impairment frequently serving to destroy the effectiveness of the valve proper. The termination of the stem within the socket has made deflating difficult unless a special tool was at hand, and there has been danger of loss of several of the parts relating to the valve when removed. The combined screw-driver and deflating projection has usually been formed as a solid projection on the top of the cap, so that by unscrewing the cap and inverting it it could be used for separating or deflecting the valve.

My present invention aims to provide an improved construction of valve in which the danger of loss of the several parts when separated will be avoided, the valve can be deflated with the finger without requiring any special tool, the plug can be unscrewed without interference from the valve-stem, and danger of impairing the valve or deflating-stem by the screwing operation will be avoided, and it aims to provide an improved construction of cap which can be used for unscrewing the plug without danger to the stem or interference therewith. To this end in carrying out the preferred form of my present improvements I construct the valve proper with a rearwardly-extending stem, and confine the spring on this stem by a spring-holder movable relatively to but inseparable from the stem, and I form the deflating-stem preferably as a continuation of the spring-carrying stem, which projects flush with or beyond the outer end of the shell, and I provide a cap for closing the end of the shell, which has a tubular projection of sufficient internal diameter to pass freely over the end of the stem when the cap is inverted, which projection is provided at its extremity with screw-driver provisions for engaging like provisions on the plug, and I provide certain other features of improvement, which will be hereinafter fully set forth.

Figure 2:
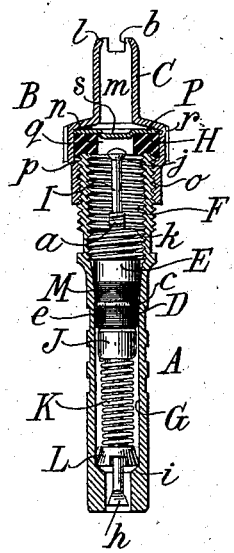
Figure 3:
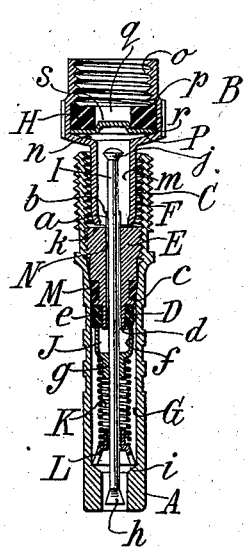
Figure 5:
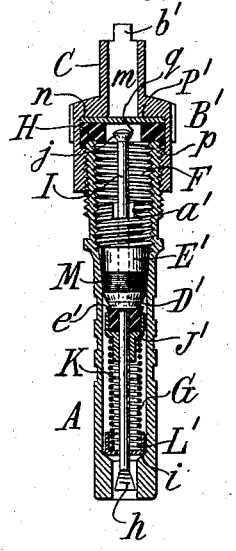
Figure 4:
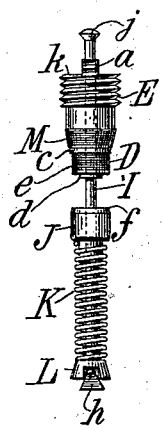
Figure 6:
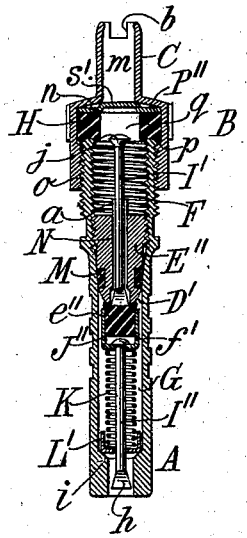

In the accompanying drawings, which show certain adaptations of my invention, Figure 1 is a side elevation of a tire-valve and cap embodying the preferred form of my improvements. Fig. 2 is an axial section thereof, showing the internal parts in elevation and the cap applied. Fig. 3 is an axial section showing the internal parts in section and the cap inverted for screwing the plug. Fig. 4 is a side elevation of the internal parts removed. Fig. 5 is an axial section showing a modification, and Fig. 6 is a similar view showing another modification.

Referring first to Figs. 1 to 4, I will describe in detail the preferred form of my invention as therein shown. In these figures let A represent the valve-shell; B, the cap; C, the projection on the latter; D, the seat member; E, the plug carrying it; F, the socket for this plug; G, the valve-chamber; H, the packing-washer in the cap; I, the deflating-stem; J, the valve proper; K, the spring; L, the spring-holder, and M a packing-ring making a leak-tight joint between the seat member and shell. In general these parts may be of any usual or suitable construction and operation, the internal parts shown being adapted to be inserted in or removed from the shell at will by screwing in or out the plug E, which for this purpose has a screw-driver provision $a$, adapted to be engaged by the screw-driver provision $b$ on the cap. The valve proper engages the seat to close the valve and is pressed inwardly of the seat by the stem to deflate the valve, air passing in and out through a duct N traversing the plug.

According to one feature of improvement the seat member consists of a tubular metal plug or body E, having a laterally-projecting shoulder or face $c$, and a longitudinal and substantially cylindrical external wall $d$ within the chamber G, and a ring of packing material $e$, seating on this face and embracing and surrounding this wall of less projection than the latter and receiving the valve proper around the latter, and the valve proper, J, has an annular flange $f$ engaging the ring $e$ outwardly of and surrounding the wall $d$ and compressing this ring longitudinally along such wall and inwardly against such wall and against the face $c$ to make a tight joint. The valve proper is hollow within the flange $f$ and cup-shaped, having a tubular inner end through which the stem I preferably passes and around which the end of the spring K is seated. The stem and valve are a sufficiently-tight fit to make a leak-tight joint, being fixed together in any suitable manner for this purpose. The stem preferably projects rearwardly of the valve proper and has loosely secured on its inner end the spring-holder L, which is preferably a perforated inverted-cup-shaped part passed over the end of the stem and held thereon by the enlargement $h$ on this end, which holder rests on the shoulder $i$ in the shell A when the valve proper is in place and then confines the spring K between this shoulder and the valve proper. When the valve proper is removed, the holder L by striking the enlargement $h$ prevents escape of the spring from the stem.

According to another feature of improvement the stem projects through the valve proper and seat member to near or beyond the outer end of the shell and has a head or enlargement $j$, preventing escape of the stem from the seat member. Thus the stem and seat member, valve proper, and spring must all in the construction shown be removed together, preventing loss of any part.

According to another feature of improvement the screw provision $a$ on the plug E consists of diametrically opposite projections on the latter, flanked by flats $k$ at each side, and the screw provision on the cap consists of a notch $b$, traversing the end of the latter diametrically and flanked by arc-shaped and rounded portions $l$, so that the extremity of the cap is smooth and rounded and cannot injure the fingers in manipulating.

According to another feature of improvement the cap is formed with a bifurcated or hollow and open-ended screw projection C, the internal socket $m$ of which is of sufficient size to pass freely over the outer end of the stem I when the projection is inserted into the socket F for screwing in or out the plug, in which case the stem passes within the socket in the projection and cannot exert any tendency to throw the cap out of engagement with the plug, nor can the stem be injured or interfered with by the projection on the cap. The socket $m$ is preferably a tubular extension of the cavity in the cap and is formed therein in any suitable way. In the construction shown in Figs. 1, 2, 3, and 6 the cap is formed by stamping, spinning, or drawing up a single sheet of metal into a tube opened at both ends, having the projection C at one end, the enlarged internal cavity or washer socket $n$, and the contracted neck $o$, which latter is screw-threaded to screw over the external thread on the shell. A shoulder $p$ at the bottom of the washer-socket $n$ prevents escape of the washer H.

Another feature of improvement relates to the washer H, which is preferably a ring of packing material sprung into the washer-socket $n$ and having a central aperture or recess $q$, into which the stem I can freely pass. I prefer to introduce an antifriction-disk, of metal, between the washer H and the cap, so that the washer will not be twisted with the screwing on and off of the cap. Any suitable device may be used for this purpose; but according to the preferred form of my invention I provide an improved washer P, having an annular edge portion $r$, bearing on the ring H, and a central projection $s$, passing into the recess in the ring H and preventing inward distortion of the latter. The compression of the ring H against the edge of the shell makes a leak-tight joint around the edge, and the compression of the disk P against the ring completes the closure of the outer end of the shell.

In use with the construction described the plug, seat, valve proper, and spring constitute attachments for valves which can be applied to the shell or removed therefrom by any ordinary person, and when any or all of these parts are connected together, as shown, separation or loss of the connected parts is avoided. The cap can be used to apply or remove the plug without danger of impairing the stem and without any disengagement of the cap by reason of internal pressure, the cap remaining in engagement with the plug until drawn out of the socket. The valve can be deflated by pressing the finger on the end of the stem without requiring any special tool, and there will be no danger of accidental deflation by reason of contact between the cap and its packing-ring and the stem. The ring $e$ of the valve-seat being out of contact with the wall of the valve-chamber will not adhere to the latter, and hence will not be torn or injured with removals of the plug. The ring will be protected by the external wall $d$ against contact with any oil which may enter the valve-casing, so that the ring will not be rotted. Its position is such that no dust or foreign matter can land on it. The cup-shaped valve proper engaging the ring near its outer edge will compress it inwardly toward the wall $d$. The valve and cap can be easily and cheaply made of small weight.

It will be seen that my invention provides improvements which can be readily and advantageously availed of, and it will be understood that the invention is not limited in its employment to the particular details of construction, arrangement, and combination of the several features shown as constituting the preferred form of the invention, since it can be employed in whole or in part, according to such modifications as circumstances or the judgment of those skilled in the art may dictate, without departing from the spirit of the invention.

Fig. 5 illustrates a construction in which the screw provision on the plug E consists of a notch $a'$ and that on the cap B' of a tip $b'$, the cap turned out of metal and having a recess $m$ bored through it. In this instance a flat friction-disk P' is employed, and the valve-seat D' consists of an annular face on the end of the plug, which face is engaged by a packing-ring $e'$, seated in a cup-shaped valve proper, J', the parts being in other respects substantially the same as those described with reference to Figs. 1 to 4, inclusive, and bearing the same reference-letters.

In Fig. 6 the antifriction-disk P'' has an upward central projection $s'$ to leave more room above the stem I', which latter in this instance is a separate deflating-pin irremovably coupled to the plug E''', the seat D' being engaged by an imperforate plug $e''$ set in a cup $f'$, to the bottom of which is fixed an inwardly-projecting stem I'', on which the spring K and holder L' are irremovably coupled. In other respects this construction is similar to and bears the same reference-letters as that described with reference to Figs. 1 to 4, inclusive.

In the construction shown in Fig. 6 the valve proper and spring constitute an attachment for valves and the plug and deflating-stem a separate attachment, while in the other views these parts together constitute a single attachment, the several parts of which cannot be lost.

In Figs. 5 and 6 the holder L' receives the end of the spring.

I claim as my invention the following-defined novel features, substantially as hereinbefore specified, namely:

1. In tire and other valves, a shell having a screw-threaded socket and a valve-chamber, in combination with a plug screwing in said socket and having screw-driver provisions, a seat held in said chamber by said plug, a valve proper engaging said seat, a stem projecting into said socket, and a screw-driver for entering said socket having projections for engaging said provisions, and having a recess for receiving said stem.

2. In tire and other valves, a valve-shell having a valve-chamber in combination with a seat member held in said chamber and having an external wall $d$ and a projecting wall $c$ therein, a valve-seat consisting of a ring of packing material carried on said walls within said valve-chamber, a cup-shaped valve proper in said chamber, having a flange $f$ surrounding the wall $d$ of said member and engaging said seat above the lower edge of said wall, and a second packing-ring separate from said first-mentioned ring and clamped between said shell and seat member outwardly of said valve-seat.

3. In tire and other valves, a shell having a valve-chamber, in combination with a seat member having outer wall $d$ and lateral wall $c$ within said chamber, a valve-seat consisting of a ring of yielding material carried on said walls within said valve-chamber, a cup-shaped valve proper inclosing the end of said member and having a flange engaging said ring and pressing it inwardly toward said wall $d$, and a second packing-ring separate from said first-mentioned ring and clamped between said shell and seat member outwardly of said valve-seat.

4. In tire and other valves, a shell having a valve-chamber and a valve-seat, in combination with a valve proper in said chamber, having a stem projecting away from said seat, a spring-holder irremovably coupled to said stem and engaging said shell, and a spring confined between said spring-holder and valve proper for seating the latter.

5. In tire and other valves, a valve, in combination with a valve-seat, a tubular member holding said seat in said shell, a valve proper and stem for said valve proper projecting rearwardly from said seat and outwardly through said member, a spring-holder coupled to the rear end of said stem and engaging said shell, and a spring confined between said holder and valve proper.

6. In tire and other valves, a valve-shell, valve-seat, and valve proper, in combination with a stem for the latter projecting toward the end of said shell, a cap screwing over the end of said shell, and a ring of packing material in said cap compressed against the end of said shell to close the latter, and having a central perforation opposite the end of said stem, and an antifriction-disk between said ring and cap having a projection opposite and extending upwardly over the perforation in the ring for receiving the end of the stem.

7. An attachment for tire and other valves consisting of a valve member adapted to be held in a valve-shell, and having external wall $d$ and lateral face $c$ for entering within a valve-chamber, and a ring of yielding material constituting a valve-seat and carried on said faces, and a packing-ring surrounding said valve member intermediate of its ends.

8. An attachment for tire and other valves consisting of a valve proper, a stem projecting rearwardly therefrom, a spring-holder irremovably coupled to said stem, and a spring confined on said stem between said valve proper and holder.

9. For tire and other valves, a valve proper having a stem projecting at both its ingress and egress sides, a spring-holder coupled to said stem, and a spring confined on said stem between said holder and valve proper.

10. For tire and other valves, a valve proper having a stem projecting at both its ingress and egress sides, a spring-holder coupled to said stem at the egress side, a spring confined on said stem between said spring-holder and valve proper, a valve-seat, and a seat member carrying said seat and irremovably coupled to said stem at the ingress side of said valve proper.

In witness whereof I have hereunto signed my name in the presence of two subscribing witnesses.

GEORGE H. F. SCHRADER.

Witnesses:
   GEORGE H. FRASER,
   THOMAS F. WALLACE.